United States Patent [19]

Krylov et al.

[11] 4,203,310
[45] May 20, 1980

[54] MILL STAND ROLL ASSEMBLY

[76] Inventors: Nikolai I. Krylov, 1 Novokuzminskaya ulitsa, 25, kv. 26, Moscow; Ilya A. Toder, Ljubertsy, Oktyabrsky prospekt, 339-a, kv. 8, Moskovskaya oblast; Oleg F. Sidorov, ulitsa Kravchenko, 10, kv. 90, Moscow; Gennady I. Tarabaev, Elektrostal, Juzhny prospekt, 3, korpus 4, kv. 74, Moskovskaya oblast; Gennady I. Pinsky, ulitsa Parkovaya, 38, kv. 37, Cherepovets, all of U.S.S.R.

[21] Appl. No.: 973,869

[22] Filed: Dec. 28, 1978

[51] Int. Cl.² .............................................. B21B 31/18
[52] U.S. Cl. ..................................................... 72/247
[58] Field of Search .................. 72/247, 245, 237, 249

[56]     References Cited
    U.S. PATENT DOCUMENTS 3,973,425   8/1976   Woodrow ............................. 72/247

FOREIGN PATENT DOCUMENTS 47-3890 of 1972 Japan ......................................... 72/247

Primary Examiner—Milton S. Mehr
Attorney, Agent, or Firm—Lackenbach, Lilling & Siegel

[57] ABSTRACT

The present invention relates to a roll assembly comprising grooved rolls. A neck of each roll is provided with a thrust shoulder placed in a thrust hydrostatic bearing mounted in a chock secured to a housing. The bearing comprises thrust disks each arranged on both end faces of the shoulders substantially parallel thereto. The sides of the disks facing the ends of each shoulder are fitted with hydrostatic pockets communicating with a fluid source. The fluid source, designed for adjustable delivery of fluid, communicates with the hydrostatic pockets of one of the thrust disks of a roll and of the other thrust disk facing it. There is another fluid source with adjustable delivery of fluid communicating with the hydrostatic pockets of the other thrust disks. This enables, by varying the deliveries of the fluid sources, the mutual disposition of the shoulders to be adjusted relative to the thrust disks and thereby permits control over the mutual arrangement of the rolls directly in the course of rolling.

1 Claim, 1 Drawing Figure

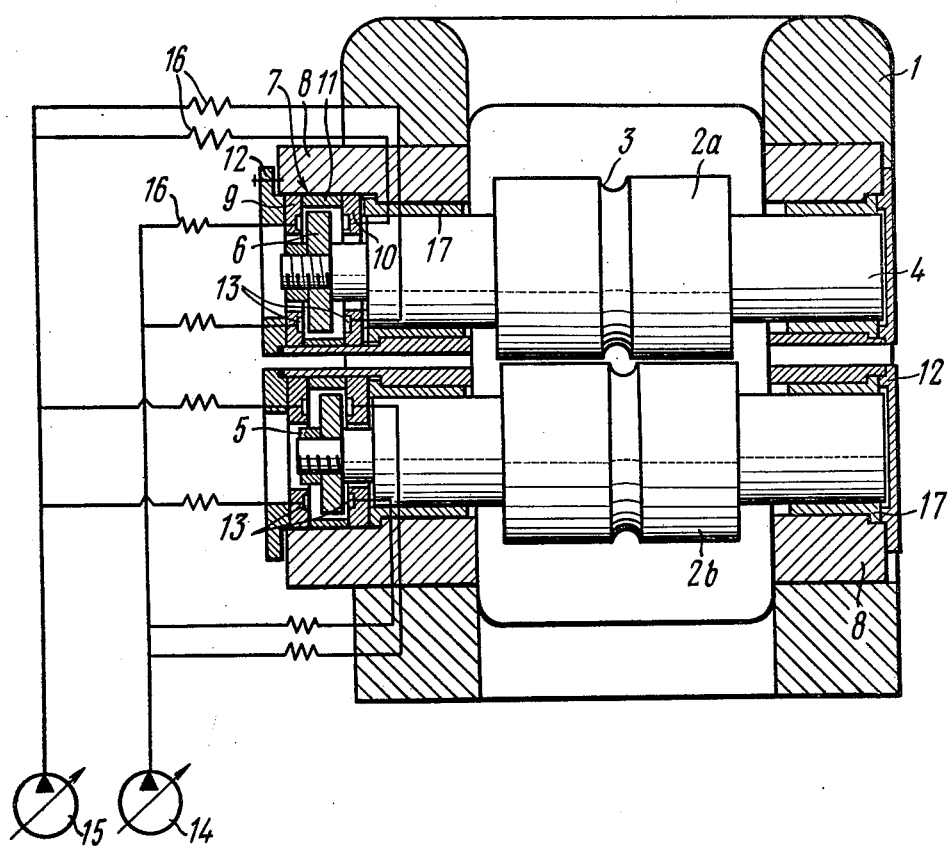

MILL STAND ROLL ASSEMBLY

BACKGROUND OF THE INVENTION

1. Field of the Invention

The present invention relates to rolling and more particularly to a mill stand roll assembly.

The mill stand roll assembly of the present invention can be used in section and wire rolling mills.

The invention is readily applicable in other industries where an accurate adjustment of the mutual axial disposition of two shafts may be required, as, for example, in disk shears for setting up disk blades or in straightening machines.

2. Description of the Prior Art

There is widely known a mill stand roll assembly comprising two grooved rolls arranged in parallel with one another and intended for passing therebetween billets in order to effect the rolling thereof.

Each of the rolls has end necks coaxial with the roll, each free end of said necks having a thrust shoulder.

Each thrust shoulder is placed inside a thrust double-sided hydrostatic bearing set in a chock serving as a housing for said bearing and secured to the roll housing.

The hydrostatic bearing has thrust disks each arranged on both end faces of each shoulder substantially parallel thereto. The sides of the disk facing the end faces of the thrust shoulder have hydrostatic pockets communicating with a fluid source through an orifice in body of the disk. As is readily apparent to those skilled in the art that the hydrostatic pockets are recesses in the body of the disk near the orifice for supplying the liquid. Said recesses are intended to receive the liquid under pressure and create a hydrostatic pressure field in the gap between the disk and the shoulder balancing the axial load applied to the shoulder.

In the construction under consideration, there is a single fluid source of constant delivery communicating with all the hydrostatic pockets through throttling valves.

In the known roll assembly, the mutual arrangement of grooved rolls, i.e. the accuracy of alignment of roll grooves, is determined by the mutual position of the shoulders with respect to the housing, this being ensured by an adequate setting of the thrust bearings with respect to the housing.

However, in the process of rolling the rolls tend to move one with respect to the other within the clearances and the deformations of the thrust bearings. This displacement is governed by the axial force applied to the rolls and by the rigidity of the hydrostatic bearings, said rigidity being substantially a function of the hydraulic resistance of the throttling valves.

The displacement of the rolls causes a change in the mutual positions of the roll grooves, this resulting in poor accuracy of the manufactured items.

Parallel with this, the displacement of the rolls causes a redistribution of the gaps between the thrust shoulder and the disks, more specifically: the gap between the shoulder and the loaded disk decreases, whereas that between the shoulder and the non-loaded disk increases. Accordingly, the disk taking up the load is subject to more severe service conditions than the non-loaded one. The adjustment of the mutual arrangement of the grooved rolls in the known roll assembly necessitates the stoppage of the mill, this lowering the efficiency thereof.

SUMMARY OF THE INVENTION

It is therefore an object of the present invention to a provide roll assembly, wherein fluid sources are connected to hydrostatic pockets in such a manner as to permit control over the mutual positions of the rolls in the process of rolling.

Another object of the invention is to improve the service conditions for the hydrostatic bearings by increasing the amount of the liquid, passing between the thrust shoulder and the loaded disk, intended to control the mutual arrangement of the grooved rolls.

The above and other objects ae attained in a roll assembly comprising grooved rolls, each thrust shoulder being formed on the roll neck and located inside a thrust hydrostatic bearing accommodated in a chock secured to the roll housing and having thrust disks each arranged on both end faces of each shoulder substantially parallel thereto, said disks being provided with hydrostatic pockets on their sides facing the end faces of each shoulder and communicating with a variable delivery fluid source, according to the invention, the fluid source being capable of providing variable delivery of fluid and communicating with the hydrostatic pockets of one of the thrust disks of one roll and of the opposite thrust disk of another roll, there being another variable delivery fluid source, also capable of providing a variable delivery of fluid, communicating with the hydrostatic pockets of the remaining thrust disks, this enabling the mutual disposition of the shoulder to be adjusted relative to the thrust disk by varying the delivery of the fluid sources and thereby permitting control over the mutual arrangement of the rolls. The roll assembly of the present invention, makes it possible to effect, directly in the process of rolling, a fairly accurate adjustment of the relative positions of the rolls within the gaps between the thrust shoulder and the thrust disks of each hydrostatic bearing, this improving the accuracy of manufacture of rolled items without sacrificing efficiency.

At the same time, the increase in the gap between the thrust shoulder and the loaded disk, which is a precondition for eliminating the existing displacement of the rolls ensured by increasing the amount of the liquid passing through said gap, improves the hydrostatic bearing service conditions.

BRIEF DESCRIPTION OF THE DRAWINGS

These and other objects and features of the invention become readily apparent from one embodiment thereof which will now be described by way of example with reference to the accompanying schematic drawing of the mill stand roll assembly, according to the invention.

A mill stand roll assembly mounted on a housing 1 has two grooved rolls 2a and 2b geared to a drive (omitted) for their rotation. Arranged coaxially with the grooved rolls, and provided on their surfaces are roll grooves 3 intended to form the cross section of an item being rolled. There may be a greater number of rolls.

The rolls 2a and 2b have coaxial necks 4, the free ends of which carry thrust shoulders 6 secured by means of nuts 5. The shoulders 6 are located in thrust hydrostatic bearings 7, set in chocks 8. The chocks 8, serving as housings for the hydrostatic bearings 7, are fastened in the housing 1.

Each of the thrust hydrostatic bearings 7 comprises a thrust disk 9 located opposite external end face (i.e. the left-hand end face as viewed in the FIGURE) of the shoulder 6, a thrust disk 10 located opposite the internal end face (i.e. the right-hand end face as viewed in the FIGURE) of the shoulder 6, a spacer ring 11 inserted between the disks 9 and 10 and determining the gap between said disks 9 and 10 and the shoulder 6, and a cover 12 fastening the bearing 7 in the chock 8 and rigidly set in said chock 8.

The rolls 2a and 2b are locked in the axial direction with respect to the housing 1 with the aid of the shoulder 6, the disks 9 and 10 and the chocks 8.

There are three hydrostatic pockets 13 on each of the surfaces of the disks 9 and 10 facing the end faces of the shoulder 6 and arranged substantially in parallel to the end faces thereof. There may be a different number of said pockets 13 in alternative embodiments of the invention.

There are provided variable delivery fluid sources 14 and 15 which are designed for delivery adjustment and are volumetric type pumps adapted to provide variable delivery of fluid.

The fluid sources 14 and 15 communicate with the hydrostatic pockets 13 via throtting valves 16 which may be of any known design suitable for the purpose. In their turn, the pockets 13 of the disk 9 of the roll 2a and of the disk 10 of the roll 2b communicate with the source 14, whereas the pockets 13 of the disk 10 of the roll 2a and of the disk 9 of the roll 2b are connected to the fluid source 14. Radial bearings 17 of known design, placed on the necks 4 and located inside the chocks 8 are designed to take up the radial forces acting upon the rolls 2a and 2b.

The roll assembly of the invention, operates as follows.

As an item being rolled enters the grooves 3 between the rotating rolls 2a and 2b, an axial force, resulting from an inaccuracy in the shape of the workpiece rolled in the preceding stand or because of the mechanical properties of the material of the item or for any other reason, displaces the rolls 2a and 2b axially in different directions.

Additionally, as shown in the FIGURE, the shoulder 6 associated with the roll 2a shifts in the directions of the disk 9, and the shoulder associated with the roll 2b, in the direction of the disk 10. The gaps between the shoulder 6 and the disks 9 and 10 vary accordingly.

The coaxial position of the grooves 3 on the rolls 2a and 2b is restored by increasing the gap between the shoulder 6 of the roll 2a and the disk 9, and between the shoulder 6 of the roll 2b and the disk 10, this being achieved by increasing the delivery of the source 14, for example, by increasing the speed of rotation of the plunger pump.

At the same time, the effectiveness of the adjustment can be enhanced by reducing the delivery of the source 15. The process of adjustment can be automated if the signal for varying the delivery of said pumps with the aid of corresponding devices is fed as a function either of the displacement of the grooves 3 or of the change in the shape of the workpiece from the grooves 3.

The above roll assembly makes possible an accurate adjustment of the shape of an item being rolled, thereby contributing to a greater efficiency of the stand and improving the quality of the product.

And again, the increase in the gap between the shoulder and the loaded disk due to an increase in the quantity of a lubricating liquid passing through the gap improves the service conditions of the hydrostatic bearing.

A prototype of said roll assembly has been put through tests which have confirmed an effective control over the shape of items being rolled and the improvement in the service conditions for the bearing without any loss of efficiency.

It is to be understood that the form of the invention, herewith shown and described, is to be taken as a preferred embodiment, and that various changes in the shape, size and arrangement of parts may be resorted to, without departing from the spirit of the invention, or the scope of the claims below. We claim:

1. A roll assembly comprising: a roll housing; chocks secured on said housing; thrust hydrostatic bearings mounted in said chocks; grooved rolls having necks formed with thrust shoulders and mounted in said thrust hydrostatic bearings, said thrust shoulders having end faces; drive means for said grooved rolls; thrust disks of said thrust hydrostatic bearings each provided on said faces of said thrust shoulder substantially parallel thereto; opposite sides of said thrust disks facing said end faces of said thrust shoulder; hydrostatic pockets formed on said opposite sides of said thrust disks; a variable delivery fluid source, said fluid source communicating with said hydrostatic pockets of one of said thrust disks of one of said thrust hydrostatic bearings of one of said grooved rolls and of the oppositely disposed other of said thrust disks of another of said thrust hydrostatic bearings of another of said grooved rolls; another fluid source of adjustable delivery; said another fluid source communicating with said hydrostatic pockets of the remaining of said thrust disks of one and another said thrust hydrostatic bearings; by varying the delivery of said fluid source and the delivery of said another fluid source, it is possible to adjust mutually the disposition of each of said thrust shoulders with respect to the corresponding one of said thrust disks for effecting an adjustment of the mutual disposition of said grooved rolls.

* * * * *